United States Patent
Chen et al.

(10) Patent No.: US 11,715,030 B2
(45) Date of Patent: Aug. 1, 2023

(54) AUTOMATIC OBJECT OPTIMIZATION TO ACCELERATE MACHINE LEARNING TRAINING

(71) Applicant: Red Hat, Inc., Raleigh, NC (US)

(72) Inventors: Huamin Chen, Westford, MA (US); Dennis R. C. Keefe, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 1160 days.

(21) Appl. No.: 16/369,694

(22) Filed: Mar. 29, 2019

(65) Prior Publication Data

US 2020/0311599 A1   Oct. 1, 2020

(51) Int. Cl.
| | | |
|---|---|---|
| G06F 12/00 | (2006.01) | |
| G06N 20/00 | (2019.01) | |
| G06F 16/215 | (2019.01) | |
| G06F 3/06 | (2006.01) | |
| G06F 18/214 | (2023.01) | |

(52) U.S. Cl.
CPC ........... *G06N 20/00* (2019.01); *G06F 3/0619* (2013.01); *G06F 3/0641* (2013.01); *G06F 3/0673* (2013.01); *G06F 16/215* (2019.01); *G06F 18/214* (2023.01)

(58) Field of Classification Search
CPC .... G06F 3/0619; G06F 3/0641; G06F 3/0673; G06F 16/215; G06N 20/00; G06K 9/6256
See application file for complete search history.

(56) References Cited

U.S. PATENT DOCUMENTS

| | | | |
|---|---|---|---|
| 9,471,882 B2 | 10/2016 | Hido et al. | |
| 10,127,214 B2 | 11/2018 | Munro et al. | |
| 2014/0314311 A1* | 10/2014 | Garera | G06K 9/6263 382/159 |
| 2016/0132787 A1 | 5/2016 | Drevo et al. | |
| 2017/0132512 A1 | 5/2017 | Ioffe | |

(Continued)

FOREIGN PATENT DOCUMENTS

WO    2018226492 A1    12/2018

OTHER PUBLICATIONS

Author Unknown, "Build a Machine Learning Model: Build and train a predictive model with Amazon Machine Learning," aws.amazon.com/getting-started/projects/build-machine-learning-model/, accessed Dec. 17, 2018, Amazon Web Services, Inc., 6 pages.

(Continued)

*Primary Examiner* — David Yi
*Assistant Examiner* — Tahilba O Puche
(74) *Attorney, Agent, or Firm* — Dority & Manning, P.A.

(57) ABSTRACT

Automatic object optimization to accelerate machine learning training is disclosed. A request for a machine learning training dataset comprising a plurality of objects is received from a requestor. The plurality of objects includes data for training a machine learning model. A uniqueness characteristic for objects of the plurality of objects is determined, the uniqueness characteristic being indicative of how unique each object is relative to each other object. A group of objects from the plurality of objects is sent to the requestor, the group of objects being selected based at least partially on the uniqueness characteristic or sent in an order based at least partially on the uniqueness characteristic.

20 Claims, 7 Drawing Sheets

(56) References Cited

U.S. PATENT DOCUMENTS

2019/0138512 A1\* 5/2019 Pourmohammad .. G08B 25/006
2020/0234162 A1\* 7/2020 Jayaraman ............. G06N 20/00

OTHER PUBLICATIONS

Grey, Allison, et al., "Deploying Deep Neural Networks with NVIDIA TensorRT," Artificial Intelligence, devblogs. nvidia.com/deploying-deep-learning-nvidia-tensorrt/, Apr. 2, 2017, NVIDIA Corporation, 12 pages.

Mukunthu, Deepak, et al., "Announcing automted ML capability in Azure Machine Learning," azure.microsoft.com/en-in/blog/announcing-automated-ml-capability-in-azure-machine-learning/, Sep. 24, 2018, 8 pages.

\* cited by examiner

AUTOMATIC OBJECT OPTIMIZATION TO ACCELERATE MACHINE LEARNING TRAINING

BACKGROUND

Machine learning technology is increasingly important to society. Training a machine learning model can take a relatively substantial amount of time, and can be relatively costly.

SUMMARY

The examples disclosed herein automatically curate machine learning training datasets based on one or more uniqueness characteristics, such as a uniqueness metric that quantifies how unique each object in the training dataset is with respect to the other objects in the training dataset. In some examples, in response from a requestor for a machine learning training dataset, the examples disclosed herein may, based on the uniqueness metric, return only a subset of the most unique objects to optimize machine learning training.

In one example, a method is provided. The method includes receiving, by a computing device comprising a processor device from a first requestor, a first request for a machine learning training dataset comprising a plurality of objects, the plurality of objects comprising data for training a machine learning model. The method further includes determining a uniqueness characteristic for objects of the plurality of objects, the uniqueness characteristic indicative of how unique each object is relative to each other object. The method further includes sending, to the first requestor, a first group of objects from the plurality of objects, the first group of objects being selected based at least partially on the uniqueness characteristic or sent in an order based at least partially on the uniqueness characteristic.

In another example a computing device is provided. The computing device includes a memory, and a processor device coupled to the memory. The processor device is to receive from a first requestor a first request for a machine learning training dataset comprising a plurality of objects, the plurality of objects comprising data for training a machine learning model. The processor device is further to determine a uniqueness characteristic for objects of the plurality of objects, the uniqueness characteristic indicative of how unique each object is relative to each other object. The processor device is further to send, to the first requestor, a first group of objects from the plurality of objects, the first group of objects being selected based at least partially on the uniqueness characteristic or sent in an order based at least partially on the uniqueness characteristic.

In another example a computer program product is provided. The computer program product is stored on a non-transitory computer-readable storage medium and includes instructions to cause a processor device to receive from a first requestor a first request for a machine learning training dataset comprising a plurality of objects, the plurality of objects comprising data for training a machine learning model. The instructions further cause the processor device to determine a uniqueness characteristic for objects of the plurality of objects, the uniqueness characteristic indicative of how unique each object is relative to each other object. The instructions further cause the processor device to send, to the first requestor, a first group of objects from the plurality of objects, the first group of objects being selected based at least partially on the uniqueness characteristic or sent in an order based at least partially on the uniqueness characteristic.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
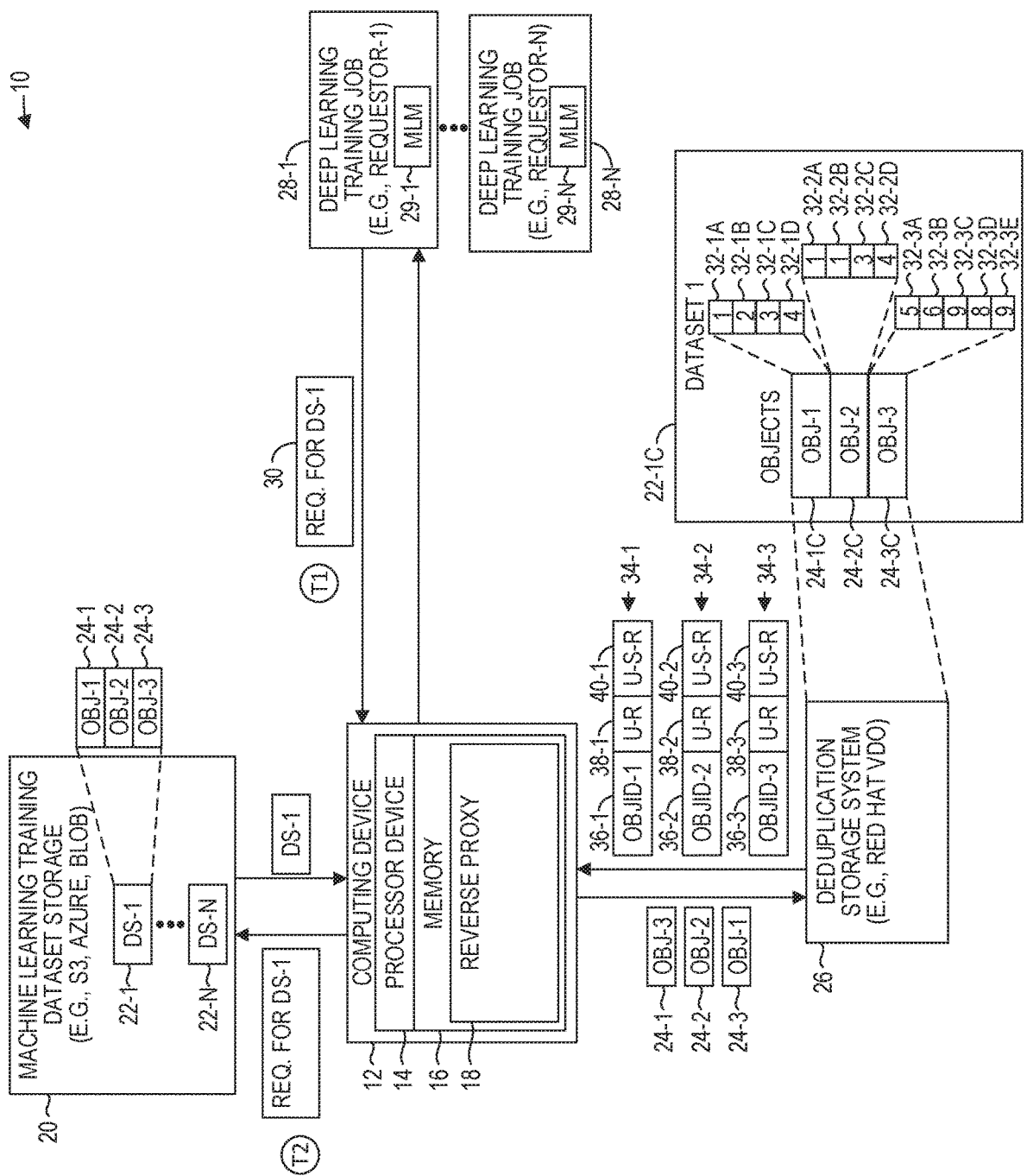
FIGS. 1A-1B are block diagrams of an environment in which examples for automatic object optimization to accelerate machine learning training can be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first requestor" and "second requestor," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Machine learning technology is becoming increasingly important, and is being used in many different fields. Machine learning technology typically relies on a machine learning model that has been trained by running one or more training datasets through the machine learning model.

Machine learning training datasets can be quite large and can be highly duplicative. A machine learning training dataset may include hundreds of objects, such as hundreds of files, some of which may be exact duplicates, and others which may be largely duplicative of other objects in the training dataset. Training a machine learning model with duplicative data can have a negative impact both on model generation and the training process. For example, a machine learning training dataset with non-negligible duplicate data may erroneously overweight certain layers and result in a wrong machine learning model. Curation of machine learning training datasets can significantly accelerate machine learning training and use substantially less resources than may otherwise be needed to train a machine learning model.

The examples disclosed herein automatically curate machine learning training datasets based on one or more uniqueness characteristics, such as a uniqueness metric that quantifies how unique objects in the training dataset are with respect to the other objects in the training dataset. In response from a requestor for a machine learning training dataset, the examples disclosed herein may, based on the uniqueness metric, return only a subset of the most unique objects. The examples herein may also provide the objects in the training dataset in an order from most unique to least unique. The examples may automatically remove objects in a training dataset that are entirely duplicative of data contained in other objects of the training dataset.

In particular, in one example, a computing device, such as a reverse proxy, receives, from a requestor, a request for a machine learning training dataset that includes a plurality of objects. The reverse proxy determines a uniqueness characteristic for objects of the plurality of objects. The uniqueness characteristic is indicative of how unique each object is relative to each other object. The reverse proxy sends, to the requestor, a group of the objects, the group of objects being selected based at least partially on the uniqueness characteristic or sent in an order based at least partially on the uniqueness characteristic. The group of objects may be each of the plurality of objects, or may be a subset of the plurality of objects.

FIG. 1A is a block diagram of an environment 10 in which examples may be practiced. The environment 10 includes a computing device 12 which comprises a processor device 14 and a memory 16. A reverse proxy 18 executes on the processor device 14 in the memory 16. Because the reverse proxy 18 is a component of the computing device 12, functionality implemented by the reverse proxy 18 may be attributed to the computing device 12 generally. Moreover, in examples where the reverse proxy 18 comprises software instructions that program the processor device 14 to carry out functionality discussed herein, functionality implemented by the reverse proxy 18 may be attributed herein to the processor device 14.

The computing device 12 is communicatively coupled (e.g., directly or via one or more networks) to one or more machine learning training dataset storages 20. The machine learning training dataset storage 20 contains one or more machine learning training datasets 22-1-22-N (generally, training datasets 22). The machine learning training dataset 22-1 contains a plurality of objects 24-1-24-3. While for purposes of illustration the machine learning training dataset 22-1 comprises only three objects, in practice, a machine learning training dataset 22 may comprise hundreds or even thousands of objects. The term "object" in this context refers to an addressable distinct data structure, irrespective what such addressable distinct data structure is referred to by the associated storage system. In a file-based storage system, an object may comprise a file. In an object-based storage system, the object may comprise an object.

The objects 24 contain data for training a machine learning model. The term "machine learning model" refers to a mathematical model used by a machine learning algorithm to make predictions or decisions. A machine learning model is generated based on sample data, referred to herein as training data. Thus, objects 24 contain training data used to generate, or update, a machine learning model. Different types of training datasets 22 may be used to train different machine learning models. The machine learning training dataset storage 20 may contain tens, hundreds, or thousands of different training datasets 22, each having one or more objects that comprise data for training a machine learning model.

The computing device 12 is also communicatively coupled to a deduplication storage system 26. The deduplication storage system 26 stores objects upon request, and retrieves objects upon request. When the deduplication storage system 26 receives an object, the deduplication storage system 26 segments the object into one or more blocks. The segmentation of the objects into blocks may be based on any criterion or criteria, such as a predetermined number of bytes, and/or based on the content of the data in the object, or on some physical characteristic of the object. The deduplication storage system 26 determines whether the block has previously been stored in a defined portion of the deduplication storage system 26. If so, rather than store the block a second time, the deduplication storage system 26 generates a pointer to the previously stored block. The deduplication storage system 26 also keeps track of how many of the blocks of an object were previously stored in the deduplication storage system 26 (or the defined portion) and how many blocks were unique (e.g., not previously stored), and may provide such information to the entity that requested that the object be stored in the deduplication storage system 26. While for purposes of illustration the disclosed examples are illustrated as only using the Red Hat® Virtual Data Optimizer (VDO) deduplication storage system, the examples can operate in conjunction with any storage system capable of determining that portions of an object are duplicative of portions of other objects stored in the storage system.

The environment 10 includes a plurality of requestors 28-1-28-N that has a corresponding plurality of machine learning models (MLMs) 29-1-29-N to train. At a time T1, the requestor 28-1 sends a request 30 toward the machine learning training dataset storage 20 that requests the training dataset 22-1 for training the MLM 29-1. The reverse proxy 18 receives the request 30. The receipt of the request 30 by the reverse proxy 18 may be transparent to the requestor 28-1, and thus the requestor 28-1 may not be aware of the existence of the reverse proxy 18. Alternatively, rather than send the request 30 toward the machine learning training dataset storage 20, the requestor 28-1 may be aware of the reverse proxy 18 and send the request directly to the reverse proxy 18.

The reverse proxy 18 determines that the reverse proxy 18 has not previously downloaded the training dataset 22-1, and at a time T2 retrieves the training dataset 22-1 from the machine learning training dataset storage 20. The reverse proxy 18 then sends the objects 24-1, 24-2, and 24-3 to the deduplication storage system 26. The deduplication storage system 26 receives the objects 24-1, 24-2, and 24-3 and stores corresponding object copies 24-1C, 24-2C and 24-3C in a defined portion of the deduplication storage system 26 illustrated as a training dataset 22-1C.

As the deduplication storage system 26 receives the object 24-1, the deduplication storage system 26 segments the object 24-1 into four blocks 32-1A 32-1D. For each respective block 32-1A-32-1D, the deduplication storage system 26 determines whether the respective block 32-1A-32-1D already exists in the training dataset 22-1C. This may be accomplished in any desired manner.

In some examples, the deduplication storage system 26 hashes each block 32-1A-32-1D to generate a hash value, and compares the hash value to an index of hash values of other blocks 32 stored in the training dataset 22-1C. If the generated hash value matches a hash value in the index of hash values, then the block 32 is already stored in the deduplication storage system 26, and the content of the respective block 32-1A-32-1D will be replaced with a pointer to the existing block 32. This eliminates what would otherwise be the storage of duplicate blocks 32, and thus reduces the amount of physical storage necessary to store objects in the deduplication storage system 26.

The deduplication storage system 26 returns a structure 34-1 to the reverse proxy 18 that contains an identifier 36-1 that identifies the object 24-1C, a uniqueness metric 38-1 that indicates how unique the object 24-1C is in terms of how many blocks 32-1A-32-1D are shared with other objects of the training dataset 22-1C, and a uniqueness-to-size metric 40-1 that identifies the ratio of the uniqueness metric 38-1 of the object 24-1C to the size of the object 24-1C (prior to any deduplication). The uniqueness metric 38-1 and the uniqueness-to-size metric 40-1 are both uniqueness characteristics indicative of how unique each object 24-1C-24-3C is relative to each other object 24-1C-24-3C.

The deduplication storage system 26 segments the object 24-2C into four blocks 32-2A-32-2D. Note that each of the blocks 32-2A-32-2D already exist in the training dataset 22-1C because each block 32-2A-32-2D has the same content as one of the blocks 32-1A-32-1D of the object 24-1C. Thus, the object 24-2C has a uniqueness metric of 0%. Moreover, since three of the blocks 32-1A, 32-1C and 32-1D of the object 24-1C are the same content as blocks 32-2A, 32-2C and 32-2D of the object 24-2C, the object 24-1C as a uniqueness metric of 25%. The deduplication storage system 26 returns a structure 34-2 to the reverse proxy 18 that contains an identifier 36-2 that identifies the object 24-2C, a uniqueness metric 38-2 that indicates how unique the object 24-2C is in terms of how many blocks 32-2A-32-2D are shared with other objects of the training dataset 22-1C, and a uniqueness-to-size metric 40-2 that identifies the ratio of the uniqueness metric 38-2 of the object 24-2C to the size of the object 24-2C (prior to any deduplication).

The deduplication storage system 26 segments the object 24-3C into five blocks 32-3A-32-3E. Note that none of the blocks 32-3A-32-3E duplicate any other blocks in the training dataset 22-1C, and thus the object 24-3C has a uniqueness metric of 100%. The deduplication storage system 26 returns a structure 34-3 to the reverse proxy 18 that contains an identifier 36-3 that identifies the object 24-3C, a uniqueness metric 38-3 that indicates how unique the object 24-3C is in terms of how many blocks 32-3A-32-3E are shared with other objects of the training dataset 22-1C, and a uniqueness-to-size metric 40-3 that identifies the ratio of the uniqueness metric 38-3 of the object 24-3C to the size of the object 24-3C (prior to any deduplication).

Figure 1B:
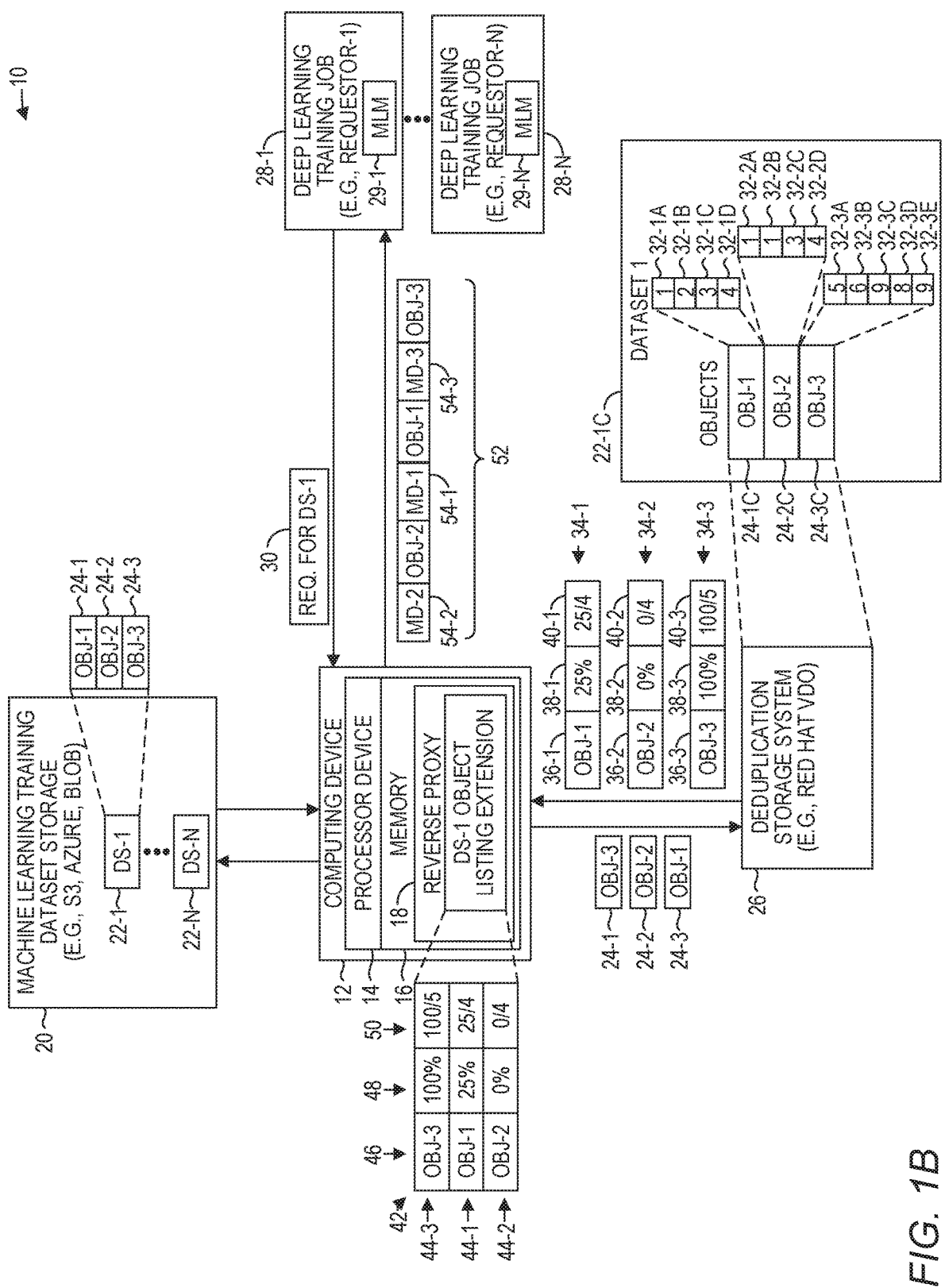

Referring now to FIG. 1B, the reverse proxy 18 receives the data structures 34-1-34-3, and builds an object listing structure 42 that identifies, for each of the objects 24-1C-24-3C, the object identifier 36, the uniqueness metric 38, and the uniqueness-to-size metric 40 for each object. In particular, in this example, the object listing structure 42 comprises three rows 44-1-44-3 (generally, rows 44), each of which corresponds to one of the objects 24-1C-24-3C. For each row 44, a column 46 identifies the object identifier 36 that identifies the respective object 24; a column 48 identifies the uniqueness metric 38 that corresponds to the respective object 24; and a column 50 identifies the uniqueness-to-size metric 40 that corresponds to the respective object 24.

The reverse proxy 18 then obtains the objects 24-1C-24-3C from the deduplication storage system 26 and sends to the requestor 28-1 a group 52 of the objects 24-1C-24-3C, the group 52 of objects 24-1C-24-3C being selected based at least partially on a uniqueness characteristic or sent in an order based at least partially on the uniqueness characteristic, such as one or both of the uniqueness metric 38 or the uniqueness-to-size metric 40. The reverse proxy 18 may also send to the requestor 28-1 object metadata 54-1, 54-2, 54-3 that contains the uniqueness metric 38 and uniqueness-to-size metric 40 for each corresponding object 24-1C-24-3C. In this example, the group 52 of objects 24-1C-24-3C are sent to the requestor 28-1 in ascending order of the uniqueness metric 38 for each object 24-1C-24-3C. In this example, the group 52 of objects 24 sent to the requestor 28-1 includes all of the objects 24-1C-24-3C in the training dataset 22-1C. In other examples, the reverse proxy 18 may automatically remove any objects that have 0% uniqueness. Thus, in the example with the training dataset 22-1C, the requestor 28-1 may automatically remove the object 24-2C from the group 52 of objects 24 sent to the requestor 28-1 since the object 24-2C has no unique blocks.

Note that in some examples, the reverse proxy 18 can query the deduplication storage system 26 at any time to obtain current uniqueness characteristics for an object. For example, a uniqueness characteristic of an object in a training dataset stored in the deduplication storage system 26 may change as more objects associated with the training dataset are stored in the deduplication storage system 26. In some examples, after all the objects of a training dataset have been stored in the deduplication storage system 26, the reverse proxy 18 may query the deduplication storage system 26 to obtain up-to-date uniqueness characteristics of the objects. In some examples, an additional object may be added to a training dataset in the machine learning training dataset storage 20, and then subsequently stored in the deduplication storage system 26. In such an example, any object listing extension maintained by the reverse proxy 18 for the respective training dataset may then be marked as "stale," and upon receipt of a subsequent request by a requestor 28 for the training dataset, the reverse proxy 18 may query the deduplication storage system 26 to obtain current uniqueness characteristics of the objects in the training dataset, and update the corresponding object listing extension accordingly.

Figure 2:
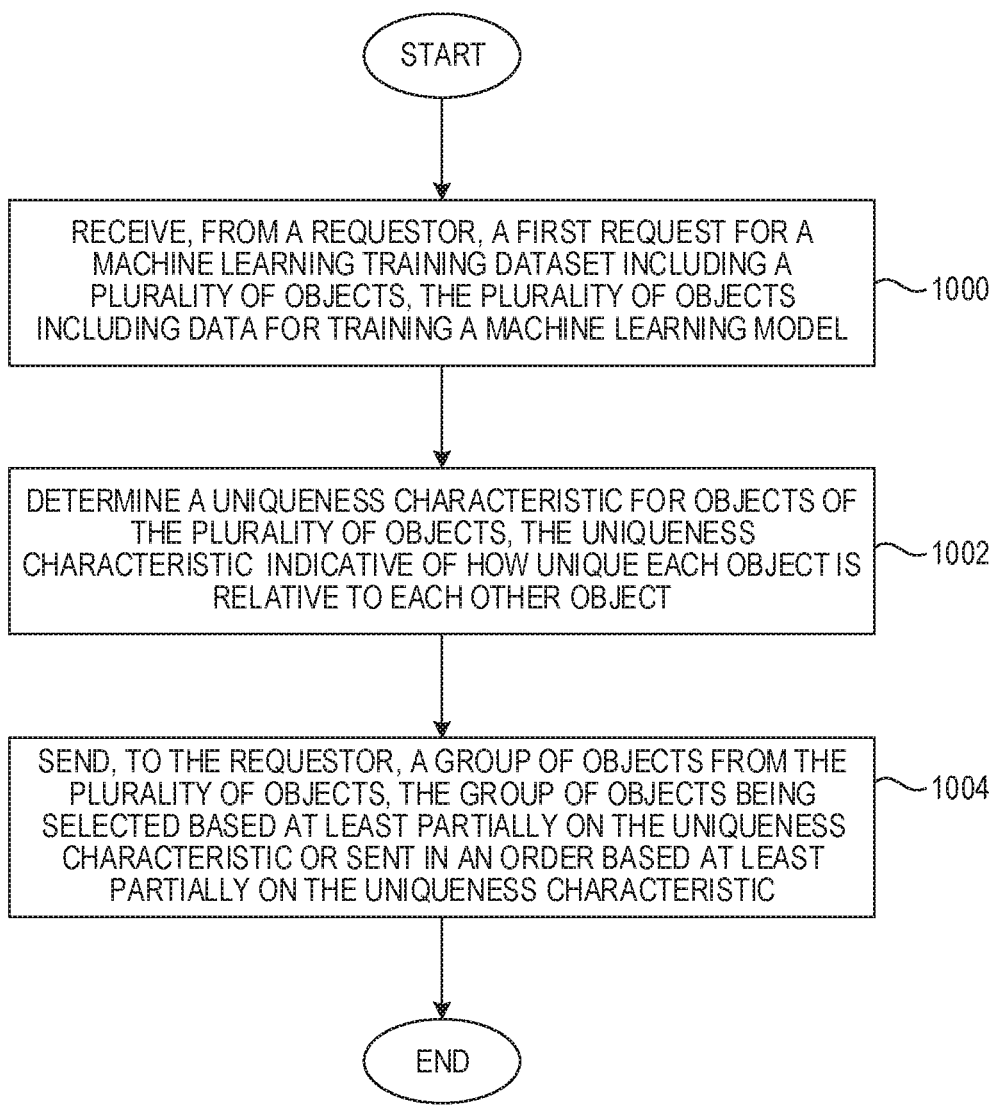
FIG. 2 is a flowchart of a method for automatic object optimization to accelerate machine learning training according to one example.

FIG. 2 is a flowchart of a method for automatic object optimization to accelerate machine learning training according to one example. FIG. 2 will be discussed in conjunction with FIGS. 1A and 1B. The computing device 12 receives the request 30 from the requestor 28-1 for the machine learning training dataset 22-1 that comprises the plurality of objects 24-1-24-3. The plurality of objects 24-1-24-3 includes data for training the MLM 29-1 (FIG. 2, block 1000). The computing device 12 determines a uniqueness characteristic for the plurality of objects 24-1-24-3, the uniqueness characteristic indicative of how unique each object 24-1-24-3 is relative to each other object 24-1-24-3 (FIG. 2, block 1002). The uniqueness characteristic may include, by way of non-limiting example, the uniqueness metric 38, and/or the uniqueness-to-size metric 40. The computing device 12 sends, to the requestor 28-1, the group 52 of objects 24-1-24-3, the group 52 of objects 24-1-24-3 being selected based at least partially on the uniqueness characteristic and/or sent in an order based at least partially on the uniqueness characteristic (FIG. 2, block 1004).

Figure 3:
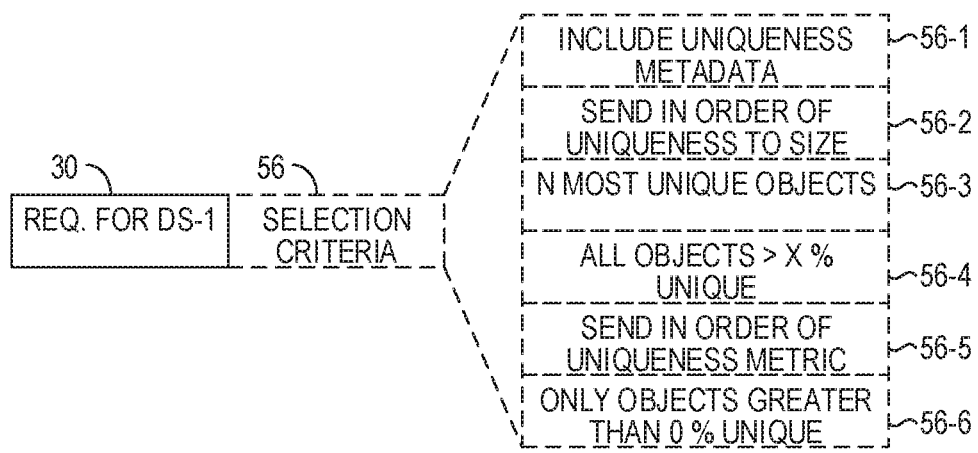
FIG. 3 is a block diagram of various selection criteria that may be provided by a requestor to a reverse proxy according to one example.

FIG. 3 is a block diagram of various selection criteria 56 that may be provided by a requestor 28 to the reverse proxy 18 according to one example. In this example, the selection criteria 56 may include a parameter 56-1 that indicates that the object metadata, such as the object metadata 54-1, 54-2, 54-3 illustrated in FIG. 1B, that contains the uniqueness metric 38 and the uniqueness-to-size metric 40 for each corresponding object 24, should be provided in the response from the reverse proxy 18. The selection criteria 56 may include a parameter 56-2 that indicates that the objects 24 should be provided in an order based on the uniqueness-to-size metric 40. The selection criteria 56 may include a parameter 56-3 that indicates that only a number N objects that have the highest uniqueness metrics 38 should be provided by the reverse proxy 18, where N is a number between 1 and the total number of objects 24 in the requested training dataset 22. The selection criteria 56 may include a parameter 56-4 that indicates that all objects 24 that have a uniqueness metric 38 greater than X should be provided by the reverse proxy 18, where X is a percentage in a range of 0 and 100 (inclusive). The selection criteria 56 may include a parameter 56-5 that indicates that the objects 24 should be provided in an order based on the uniqueness metric 38. The selection criteria 56 may include a parameter 56-6 that indicates that only objects 24 that have at least some uniqueness should be provided by the reverse proxy 18.

Figure 4:
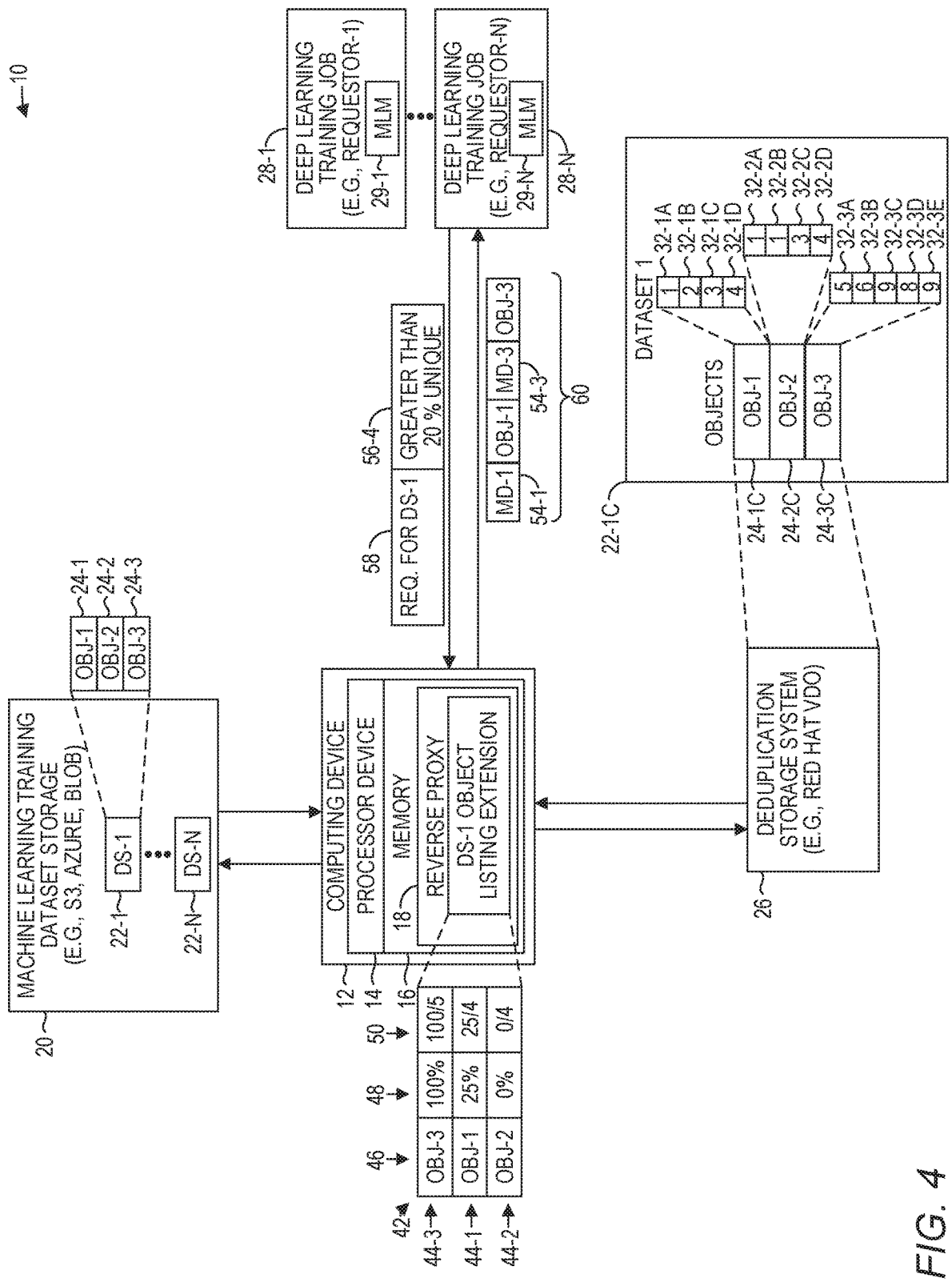
FIG. 4 is a block diagram of the environment illustrated in FIGS. 1A and 1B at a subsequent time than that illustrated in FIG. 1B, wherein a second requestor requests the same training dataset previously requested by a different requestor.

FIG. 4 is a block diagram of the environment 10 illustrated at a subsequent time than that illustrated in FIG. 1B, wherein a second requestor 28-N requests the same training dataset 22 previously requested by a different requestor. The reverse proxy 18 receives a request 58 for the machine learning training dataset 22-1. The request 58 includes the parameter 56-4 which indicates that only objects 24 being more than 20% unique should be returned by the reverse proxy 18. The reverse proxy 18 determines that the object listing structure 42 that corresponds to the machine learning training dataset 22-1 exists. In some examples, the reverse proxy 18 may interact with the machine learning training dataset storage 20 to determine whether the training dataset 22-1 has changed since the object listing structure 42 was generated. For example, the reverse proxy 18 may maintain timestamps of last modification times for each object 24 identified in the object listing structure 42, request timestamps of last modification times for each object 24 in the training dataset 22-1 from the machine learning training dataset storage 20, and determine whether any of the objects 24 in the training dataset 22-1 have been modified since the generation of the object listing structure 42. If so, the reverse proxy 18 may repeat the process of obtaining the objects 24-1-24-3 from the machine learning training dataset storage 20, storing the objects 24-1-24-3 in the deduplication storage system 26, and generating a new object listing structure 42 based on the information received from the deduplication storage system 26.

In this example assume that either the reverse proxy 18 does not interact with the machine learning training dataset storage 20 to determine whether the training dataset 22-1 has changed since the object listing structure 42 was generated, or, that the objects 24-1-24-3 have not changed since the object listing structure 42 was generated. The reverse proxy 18 determines from the object listing structure 42 that the objects 24-3C (which is a copy of the object 24-3) and 24-1C (which is a copy of the object 24-1) both have uniqueness metrics of greater than 20%, and that the object 24-2C (which is a copy of the object 24-2) has a uniqueness metric of less than 20%. The reverse proxy 18 retrieves the objects 24-1C and 24-3C from the deduplication storage system 26, and sends a group 60 of the objects 24-1C and 24-3C, and corresponding object metadata 54-1, 54-3 that contains the uniqueness metric 38 and uniqueness-to-size metric 40 for the objects 24-1C and 24-3C to the requestor 28-N.

Figure 5:
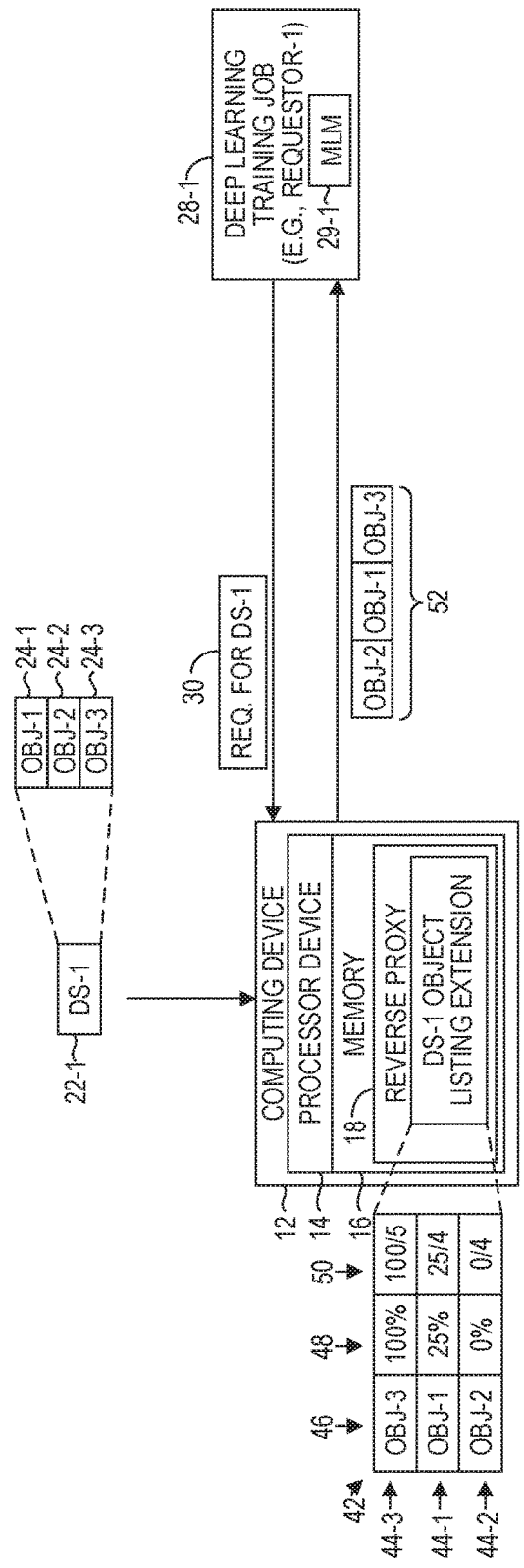
FIG. 5 is a simplified block diagram of the environment illustrated in FIGS. 1A and 1B according to another example.

FIG. 5 is a simplified block diagram of the environment 10 according to another example. The environment 10 includes the computing device 12, the memory 16, and the processor device 14 coupled to the memory 16. The processor device 14 is to receive the request 30 for the machine learning training dataset 22-1 comprising the plurality of objects 24-1-24-3. The plurality of objects 24-1-24-3 comprises data for training the machine learning model 29-1. The processor device 14 determines a uniqueness characteristic for the plurality of objects 24-1-24-3, the uniqueness characteristic indicative of how unique each object 24 is relative to each other object 24. The processor device 14 sends, to the requestor 28-1, the group 52 of the objects 24-1-24-3 from the plurality of objects 24-1-24-3, the group of objects 24-1-24-3 being selected based at least partially on the uniqueness characteristic or sent in an order based at least partially on the uniqueness characteristic.

Figure 6:
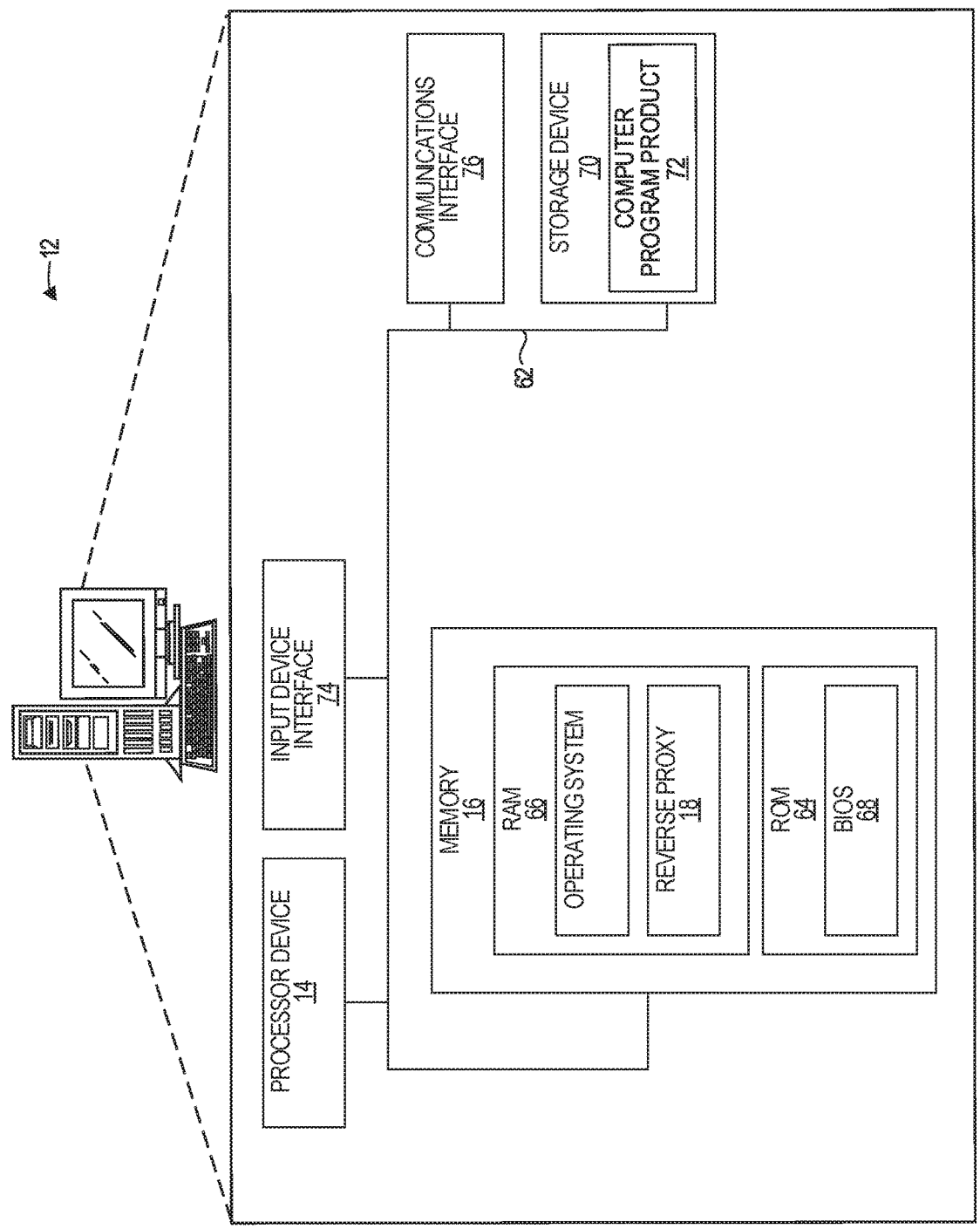
FIG. 6 is a block diagram of a computing device suitable for implementing examples according to one example.

FIG. 6 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 14, the memory 16, and a system bus 62. The system bus 62 provides an interface for system components including, but not limited to, the memory 16 and the processor device 14. The processor device 14 can be any commercially available or proprietary processor.

The system bus 62 may be any of several types of bus structures that may further interconnect to a memory bus (with or without a memory controller), a peripheral bus, and/or a local bus using any of a variety of commercially available bus architectures. The memory 16 may include non-volatile memory 64 (e.g., read-only memory (ROM), erasable programmable read-only memory (EPROM), electrically erasable programmable read-only memory (EEPROM), etc.), and volatile memory 66 (e.g., random-access memory (RAM)). A basic input/output system (BIOS) 68 may be stored in the non-volatile memory 64 and can include the basic routines that help to transfer information between elements within the computing device 12. The volatile memory 66 may also include a high-speed RAM, such as static RAM, for caching data.

The computing device 12 may further include or be coupled to a non-transitory computer-readable storage medium such as a storage device 70, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 70 and other drives associated with computer-readable media and computer-usable media may provide nonvolatile storage of data, data structures, computer-executable instructions, and the like.

A number of modules can be stored in the storage device 70 and in the volatile memory 66, including an operating system and one or more program modules, such as the reverse proxy 18, which may implement the functionality described herein in whole or in part.

All or a portion of the examples may be implemented as a computer program product 72 stored on a transitory or non-transitory computer-usable or computer-readable storage medium, such as the storage device 70, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the reverse proxy 18 in the volatile memory 66, may serve as a controller, or control system, for the computing device 12 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 14 through an input device interface 74 that is coupled to the system bus 62 but can be connected by other interfaces such as a parallel port, an Institute of Electrical and Electronic Engineers (IEEE) 1394 serial port, a Universal Serial Bus (USB) port, an IR interface, and the like.

The computing device 12 may also include a communications interface 76 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a computing device comprising a processor device from a first requestor, a first request for a machine learning training dataset comprising a plurality of objects, the plurality of objects comprising data for training a machine learning model;
   determining a uniqueness metric for objects of the plurality of objects, the uniqueness metric indicative of how unique each object is relative to each other object; and
   sending, to the first requestor, a first group of objects from the plurality of objects, the first group of objects being selected based at least partially on the uniqueness metric or sent in an order based at least partially on the uniqueness metric, wherein:
      a uniqueness metric of a first object of the first group of objects is less than a uniqueness metric of a second object of the first group of objects; and
      the uniqueness metric of the first object of the first group of objects is greater than a uniqueness metric of a third object of the first group of objects.

2. The method of claim 1 wherein determining the uniqueness metric comprises:
   obtaining each object from a machine learning training dataset storage;
   storing each object in a deduplication storage system; and
   receiving the uniqueness metric for each object from the deduplication storage system.

3. The method of claim 1 further comprising:
   generating, by the computing device, an object listing structure that corresponds to the machine learning training dataset, the object listing structure identifying each object in the machine learning training dataset and identifying the uniqueness metric associated with each object.

4. The method of claim 3 further comprising:
   receiving, by the computing device from a second requestor, a second request for the machine learning training dataset;
   determining, by the computing device, that the object listing structure that corresponds to the machine learning training dataset exists;
   accessing the object listing structure; and
   sending, to the second requestor, a second group of objects, the second group of objects being selected based on the uniqueness metric or sent in an order based on the uniqueness metric.

5. The method of claim 1 further comprising:
   determining that at least one object in the plurality of objects contains no unique data; and
   not including the at least one object in the first group of objects based on determining that the at least one object in the plurality of objects contains no unique data.

6. The method of claim 1, wherein the first request includes object selection criteria, and wherein sending the first group of objects to the first requestor in the order based at least partially on the uniqueness metric comprises sending the first group of objects to the requestor in the order based at least partially on the uniqueness metric in accordance with the object selection criteria.

7. The method of claim 6 wherein the object selection criteria requests a number N of the most unique objects, and further comprising selecting only the number N objects that have a highest uniqueness metric for the first group of objects.

8. The method of claim 6 wherein the object selection criteria requests all objects having a uniqueness metric greater than X, and further comprising selecting only the objects that have a uniqueness metric greater than X for the first group of objects.

9. The method of claim 1 wherein sending the first group of the objects from the plurality of objects, the first group of objects being selected based on the uniqueness metric or sent in an order based at least partially on the uniqueness metric comprises sending the first group of objects in an order from a highest uniqueness metric to a lowest uniqueness metric.

10. The method of claim 1 wherein sending the first group of the objects from the plurality of objects, the first group of objects being selected based on the uniqueness metric or sent in an order based at least partially on the uniqueness metric comprises sending the first group of objects in an order from a greatest uniqueness-to-size ratio to a lowest uniqueness-to-size ratio.

11. The method of claim 1 wherein each object comprises a plurality of blocks, and the uniqueness metric is based on a number of unique blocks contained by each object, each unique block not being contained by any other object.

12. The method of claim 1 wherein the computing device comprises a reverse proxy, and wherein the first request is directed toward a machine learning training dataset storage, the reverse proxy intercepting the first request and sending the first group of objects to the first requestor in a manner that is transparent to the first requestor.

13. A computing device, comprising:
a memory; and
a processor device coupled to the memory to:
receive from a first requestor a first request for a machine learning training dataset comprising a plurality of objects, the plurality of objects comprising data for training a machine learning model;
determine a uniqueness metric for objects of the plurality of objects, the uniqueness metric indicative of how unique each object is relative to each other object; and
send, to the first requestor, a first group of objects from the plurality of objects, the first group of objects being selected based at least partially on the uniqueness metric or sent in an order based at least partially on the uniqueness metric, wherein:
a uniqueness metric of a first object of the first group of objects is less than a uniqueness metric of a second object of the first group of objects; and
the uniqueness metric of the first object of the first group of objects is greater than a uniqueness metric of a third object of the first group of objects.

14. The computing device of claim 13, wherein the first request includes object selection criteria, and wherein to send the first group of objects to the first requestor in the order based at least partially on the uniqueness metric, the processor device is further to send the first group of objects to the first requestor in the order based at least partially on the uniqueness metric in accordance with the object selection criteria.

15. The computing device of claim 13 wherein each object comprises a plurality of blocks, and the uniqueness metric is based on a number of unique blocks contained by each object, each unique block not being contained by any other object.

16. The computing device of claim 13 wherein the processor device is further to:
determine that at least one object in the plurality of objects contains no unique data; and
not include the at least one object in the first group of objects based on determining that the at least one object in the plurality of objects contains no unique data.

17. A computer program product stored on a non-transitory computer-readable storage medium and including instructions to cause a processor device to:
receive from a first requestor a first request for a machine learning training dataset comprising a plurality of objects, the plurality of objects comprising data for training a machine learning model;
determine a uniqueness metric for objects of the plurality of objects, the uniqueness metric indicative of how unique each object is relative to each other object; and
send, to the first requestor, a first group of objects from the plurality of objects, the first group of objects being selected based at least partially on the uniqueness metric or sent in an order based at least partially on the uniqueness metric, wherein:
a uniqueness metric of a first object of the first group of objects is less than a uniqueness metric of a second object of the first group of objects; and
the uniqueness metric of the first group of objects is greater than a uniqueness metric of a third object of the first group of objects.

18. The computer program product of claim 17 wherein the first request includes object selection criteria, and wherein to send the first group of objects to the first requestor in the order based at least partially on the uniqueness metric, the instructions further cause the processor device to send the first group of objects to the first requestor in the order based at least partially on the uniqueness metric in accordance with the object selection criteria.

19. The computer program product of claim 17 wherein each object comprises a plurality of blocks, and the uniqueness metric is based on a number of unique blocks contained by each object, each unique block not being contained by any other object.

20. The computer program product of claim 17 wherein the instructions further cause the processor device to:
determine that at least one object in the plurality of objects contains no unique data; and
not include the at least one object in the first group of objects based on determining that the at least one object in the plurality of objects contains no unique data.

* * * * *